United States Patent [19]

Johnson

[11] Patent Number: 4,941,686
[45] Date of Patent: Jul. 17, 1990

[54] IDENTITY CARD

[76] Inventor: Charles R. Johnson, 3115 S. Rosanna St., Las Vegas, Nev. 89117

[21] Appl. No.: 246,367

[22] Filed: Sep. 19, 1988

[51] Int. Cl.$^5$ .................. B42D 15/00; B42D 15/04; B42D 19/00; B05D 3/12
[52] U.S. Cl. ........................... 283/87; 283/70; 283/90; 428/195
[58] Field of Search ............ 283/70, 74, 75, 87, 283/88, 89, 90, 91, 93, 94, 105, 108; 428/195

[56] References Cited

U.S. PATENT DOCUMENTS

| | | | |
|---|---|---|---|
| 3,614,430 | 10/1971 | Berler | 283/70 |
| 3,620,590 | 11/1971 | Barker | 283/70 |
| 3,713,235 | 1/1973 | Roberts | 283/75 |
| 3,784,394 | 1/1974 | Bildusas et al. | 283/88 |
| 3,802,101 | 4/1974 | Scantlin | 283/87 |
| 4,186,943 | 2/1980 | Lee | 283/70 |
| 4,304,809 | 12/1981 | Moraw et al. | 428/195 |
| 4,544,836 | 10/1985 | Galvin et al. | 283/90 |

Primary Examiner—Douglas D. Watts
Assistant Examiner—Paul M. Heyrana, Sr.
Attorney, Agent, or Firm—Quirk, Tratos & Roethel

[57] ABSTRACT

An optically-readable identity card has an inner core layer of material which inhibits light from the optical reader from passing through the body of the card. The inner core material is a plastic vinyl colored either black, gold, silver or any metallic color.

15 Claims, 1 Drawing Sheet

IDENTITY CARD

BACKGROUND OF THE INVENTION

The invention relates generally to identity cards, and more particularly to identity cards which are read by infrared or light source readers.

Plastic identity cards are rapidly becoming the ignition key necessary to travel in today's computer-driven society. Plastic credit cards are replacing cash and checks for the bulk of commercial transactions. Even when a person wishes to cash a check, he must display his plastic check-guarantee card. To obtain cash from an automated teller machine, a person first accesses the machine by inserting his plastic identity card.

Many security systems rely on plastic identity cards. An employee inserts his plastic identity card to gain access through the door of secured areas of the work place. Many pieces of equipment will not work until a plastic identity card has been inserted indicating that an authorized user is present. Even the photocopier needs a plastic identity card before reproduction can be accomplished.

In one typical application, a plastic identity card carries a magnetic strip that is encoded with the appropriate identifying information. The identity card is inserted into a magnetic strip card reader. If the reader recognizes the proper code, the equipment becomes usable by the card holder.

Magnetic strip identity cards are typically used in automated teller systems. The identity card is inserted into the card reader which grabs the card and pulls it into the reader at a uniform speed. This is necessary because the information encoded on the magnetic strip must pass over the sensing station at a uniform speed to ensure accurate detection. If the magnetic strip passes over the sensing station too slowly, too quickly or non-continuously, the reader will not properly detect the information and deny access to the user. Magnetic strips are also subject to scratching and other damage which causes the user to be denied access.

In order to avoid the problems inherent in magnetic strip identity cards, many equipment manufacturers are turning to optically-read identity cards, particularly infrared or light source readable identity cards. A series of apertures are punched through the plastic identity card, arranged in a binary code sequence, each vertical column of apertures representing a single digit. The plurality of vertical columns results in a multiple digit identity number.

In use, the identity card is inserted into an optical reader. A light source on one side of the card is shone toward the card. Light passes through the apertures and a sensor on the opposite side of the card detects the light associated with each aperture. If the identity card is recognized by the reader, the card holder is authorized to use the equipment to which the reader is connected.

Optically read identity cards have advantages over the magnetic strip identity cards. The optically read identity card is stationary in the reader during use thereby negating the necessity of using rollers or the like to grab the identity card and pass it over the reader at a constant speed. The user simply inserts the card to a fixed point, the speed of insertion being irrelevant. Inadvertent scratching or destruction of the magnetic strip is also avoided, as well as the offset of random magnetic fields to which a magnetic identity card may be subjected.

The present invention is, however, directed at solving one disadvantage that optically-readable identity cards do have. Optical identity card readers are not manufactured with uniformly intensive light sources. Depending upon the intensity of the light source, it is possible, using conventional optically-readable identity cards, to have light penetrate through the body of the identity card and to be detected by the sensor. This results in an error reading by the card reader and the user is denied access to the equipment.

It is an object of the present invention to decrease, if not eliminate, light passing through the body of optically read plastic identity cards.

It is a feature of the present invention to provide a plastic identity card with an inner core of material which decreases, if not completely eliminates, light passing through the body of the identity card.

It is an advantage of the present invention that optically readable identity cards constructed in accordance with the present invention can be used in most optical readers and these identity cards will be much more reliable than the prior art identity cards.

BRIEF DESCRIPTION OF THE INVENTION

A plastic identity card is provided at its inner core with a layer of material which inhibits light from the optical reader from passing through the body of the identity card. The material is preferably a plastic vinyl colored either black, gold or silver. Alternatively, the vinyl core can be colored with any metallic color. The term "colored" is intended to include both incorporating a color pigment into the vinyl during the manufacture of the vinyl, and alternatively, the color can be printed onto the surface of the vinyl during the manufacture of the vinyl.

DETAILED DESCRIPTION OF THE PREFERRED EMBODIMENT

Figure 1:
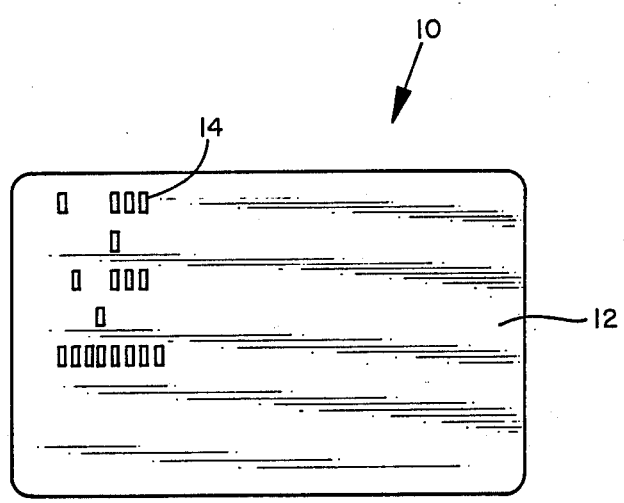
FIG. 1 shows a plastic identity card constructed in accordance with the teachings of the present invention.

FIG. 1 shows an optically-readable plastic identity card 10 of the present invention. The body 12 of the identity card is generally a five layer laminated material. A series of small generally rectangularly shaped apertures 14 are provided in the identity card 10, most usually in the upper left hand corner. These apertures are arranged in a regular series of rows and columns. Alternatively, round apertures can also be used.

In use, the identity card is placed in an optical reader. A light source shines light toward one side of the identity card. The light passes through the apertures 14 and is sensed by a sensing station on the opposite side of the identity card 10. The arrangement of the apertures according to columns and rows is recognized by the sensing station as a code, typically a binary number code.

Figure 2:
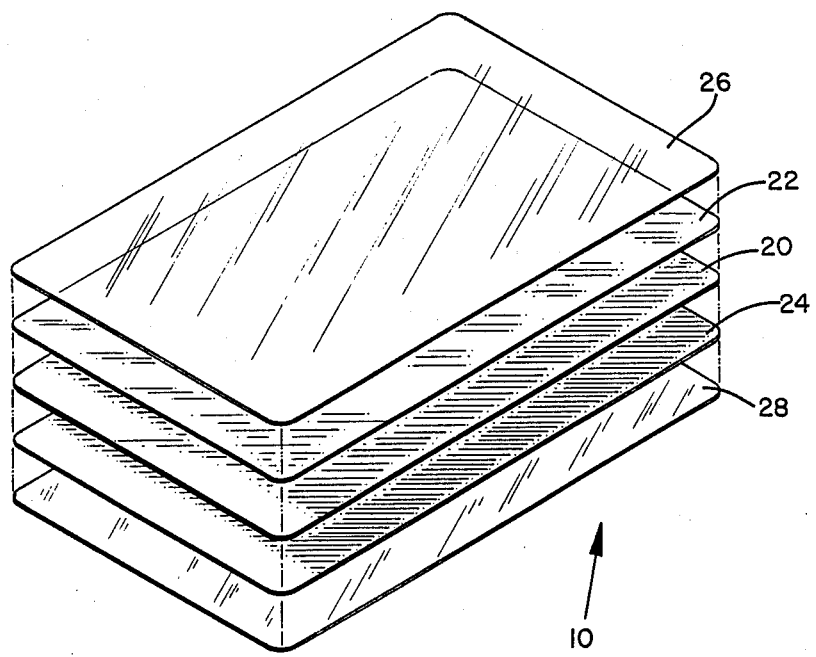
FIG. 2 shows the plastic identity card of the present invention shown in an exploded view to depict the laminate construction of the card.

FIG. 2 shows the identity card 10 of the present invention in an exploded view so that the layers can be identified. The central core layer 20 is a plastic vinyl material. When the vinyl is being made, the color is mixed directly into or printed on the vinyl so that the central core 20 is colored. Any color that will inhibit, if not completely eliminate, the passage of light through the body 12 of the identity card can be used. Preferably black, gold and silver colors are used. Also any metallic color will be acceptable. A metallic color is formed during the vinyl manufacturing process by taking a conventional base color pigment and adding metallic chips or flakes thereto. When the vinyl is formed into sheets, the resulting sheet has a metallic sheen regardless of the particular base color used. Metallic colored vinyl can be obtained from a number of manufacturers, including General Tire and Rubber Co., Canton, Ohio.

A first intermediate layer 22 and a second intermediate layer 24 are plastic vinyl material, preferably colored to provide a suitable surface for printing, most preferably colored white. A suitable surface for printing is a surface that accepts the printing of either single or multiply-colored characters or other information or depictions without affecting the intended colors to be shown. A first outer layer 26 and a second outer layer 28 are each clear plastic coating material. The plastic vinyl material of layers 20, 22 and 24 is a rigid vinyl that meets A.N.S.I. specifications which have been established for automated teller machines.

A typical plastic identity card is approximately 0.030" thick. The central core layer 20 has a thickness preferably in a range of between 0.003 and 0.010 inches, most preferably approximately 0.010 inches. Each intermediate layer 22, 24 has a thickness preferably in a range between 0.003 and 0.010 inches, most preferably approximately 0.007 inches. Each outer layer 26, 28 has a thickness preferably in a range between 0.001 and 0.005 inches, most preferably approximately 0.003 inches.

A test has been devised to determine whether a specific identity card is susceptible to permitting light to pass through the body of the card thereby causing the sensing station to improperly read the identity card. A typical optical identity card reader using an infrared light source is Model #PT 200, manufactured by Electronic Display Technology, Las Vegas, Nev. The intensity of the light passing through the body of an identity card mounted in the optical reader was measured using a radiometric filter light detector Model #S 351A manufactured by United Detector Technology, Hawthorne, Calif. Using this detection equipment, the intensity of the light source is measured in milliwatts.

The light detector Model #S 351A has a light range of between 1.70 and 1.80 milliwatts when no identity card is placed in the reader. It has been determined that an acceptable level of light intensity passing through the body of an identity card is preferably less than 0.035 milliwatts, most preferably less than or equal to 0.025 milliwatts. If the light intensity passing through the body of the identity card is below this acceptable level, the optical reader will only sense the light passing through the apertures in the card and thus accurately read the identity card.

When the central core layer 20 is made of vinyl which is colored black, gold, silver or any metallic color, the light intensity passing through the body 12 of the identity card is negligible, generally less than 0.010 milliwatts, and usually closer to approximately 0.002 milliwatts. A white vinyl central core 20 results in cards that vary in permitting light having an intensity in a range of generally 0.020 to 0.070 milliwatts to pass through the body of the identity card. Because of the variation of light intensity that may pass through individual cards, the use of a card having a white vinyl central core 20 is not acceptable There will be no assurance that each card will work in the plethora of optical readers in which the card is intended to be used.

It is only necessary to color the central core layer 20 of the identity card 10 in order to inhibit light passage through the body of the card. It is preferable that intermediate layers 22, 24 be initially white as this color provides the most suitable surface for printing. Most card users desire that printing be placed on intermediate layers 22, 24 to identify the card, depict the name and logo of the company and set out information as to the use of the card. The outer layers 26, 28 are clear plastic layers that merely provide a protection layer for the printing to inhibit scratching or other defacement of the card.

The present invention is also applicable to optically readable identity cards which do not utilize the clear outer layers 26, 28 but rather have only a three layer laminated construction. Alternatively, optically readable identity cards can be made having an overall thickness of approximately 0.024 inches, with the outer layers being each approximately 0.003 inches thick and the intermediate layers and the central core layer being each approximately 0.006 inches thick. In each of these alternative identity card constructions, the central core is a colored vinyl, preferably black, gold, silver or any metallic color, that inhibits the passage of light through the body of the identity card. The outer two layers are white to provide a suitable surface for printing information on the front and back of the card.

While the invention has been illustrated with respect to several specific embodiments thereof, these embodiments should be considered as illustrative rather than limiting. Various modifications and additions may be made and will be apparent to those skilled in the art. Accordingly, the invention should not be limited by the foregoing description, but rather should be defined only by the following claims.

I claim:

1. An optically-readable identity card having a multi-layered laminated construction, the identity card having aperture means in the body of the card for allowing light from a light source to pass through the aperture means and be sensed by a light sensor, and the multi-layered laminated construction having a central core layer of plastic vinyl which is colored to limit the passage of light through the body of the card.

2. The identity card of claim 1 wherein the vinyl is colored black.

3. The identity card of claim 1 wherein the vinyl is colored gold.

4. The identity card of claim 1 wherein the vinyl is colored silver.

5. The identity card of claim 1 wherein the vinyl is metallic colored.

6. The identity card of claim 1 wherein the intensity of light which passes through the identity card is less than 0.035 milliwatts.

7. The identity card of claim 6 wherein the intensity of light which passes through the body of the card is less than or equal to 0.025 milliwatts.

8. The identity card of claim 1 wherein the multi-layered laminated construction further includes two intermediate vinyl layers and two clear plastic outer layers.

9. The identity card of claim 8 wherein each of the intermediate vinyl layers is colored white.

10. The identity card of claim 1 wherein the central core layer has a thickness in a range of between 0.003 inches and 0.010 inches.

11. The identity card of claim 10 wherein the central core layer has a thickness of approximately 0.010 inches.

12. The identity card of claim 1 wherein the central core layer is colored by incorporating a color pigment into the plastic vinyl during the manufacture of the vinyl.

13. The identity card of claim 1 wherein the central core layer is colored by printing the color onto the surface of the plastic vinyl during the manufacture of the vinyl.

14. An optically-readable identity card having a multi-layered laminated construction, the identity card having aperture means in the body of the card for allowing light from a light source to pass through the aperture means and be sensed by a light sensor, and the multi-layered laminated construction having a central core layer of plastic vinyl which is colored to limit the passage of light through the body of the car, and two intermediate vinyl layers colored to provide a suitable surface for printing.

15. The identity card of claim 14 wherein the intermediate layers are colored white.

* * * * *